April 8, 1969 W. E. HUMPHREY 3,437,396
OPTICAL STABILIZATION WITH ROOF MIRROR
Filed Sept. 14, 1966
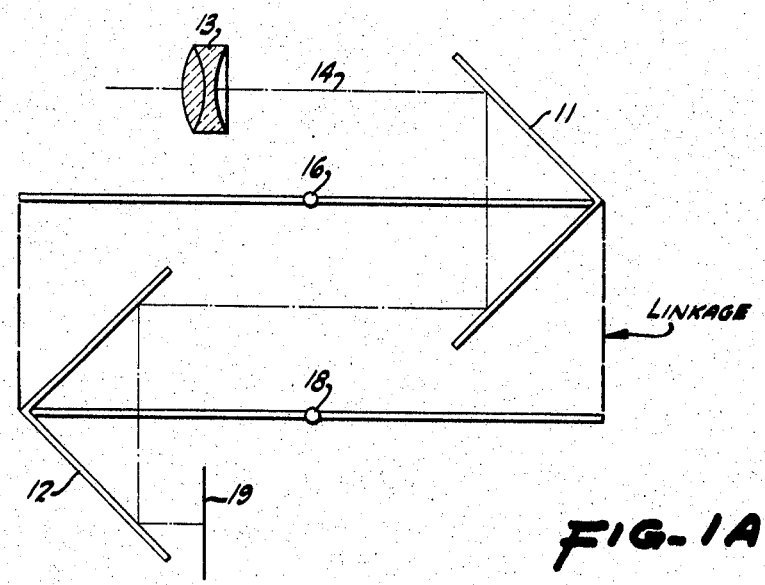
FIG.-1A
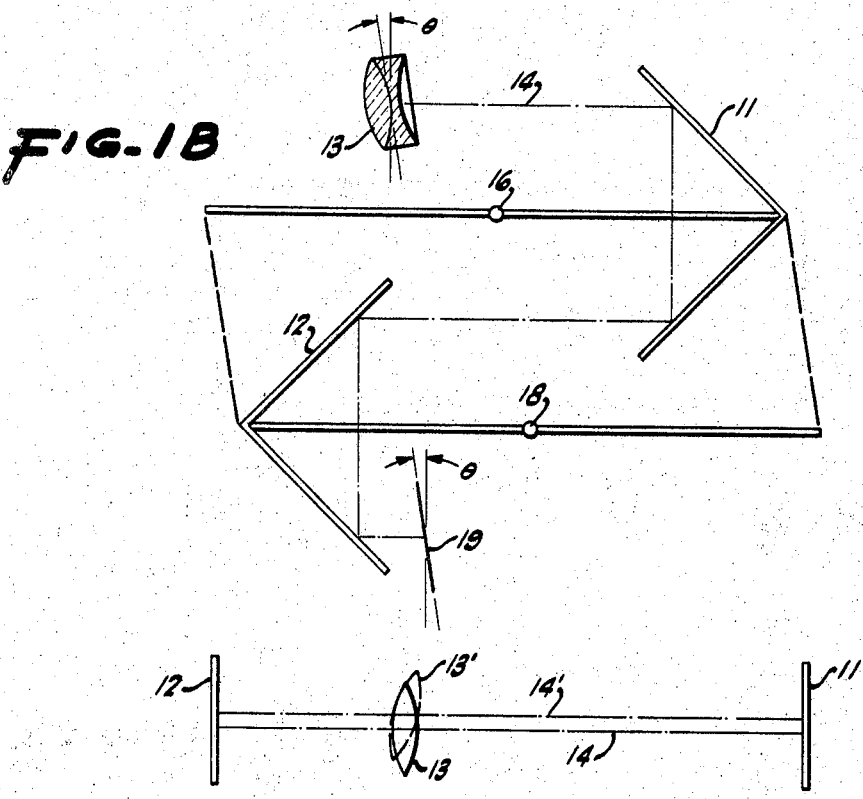
FIG.-1B
FIG.-2
INVENTOR
WILLIAM E. HUMPHREY
By Lippincott, Ralls & Hendrickson
ATTORNEYS

United States Patent Office 3,437,396
Patented Apr. 8, 1969

3,437,396
OPTICAL STABILIZATION WITH ROOF MIRROR
William E. Humphrey, Berkeley, Calif., assignor to Optical Research and Development Corporation, Oakland, Calif., a corporation of California
Filed Sept. 14, 1966, Ser. No. 579,371
Int. Cl. G02b *23/02*
U.S. Cl. 350—16                                   7 Claims

ABSTRACT OF THE DISCLOSURE

An optical stabilizer including an objective lens for focusing received light, a plane for displaying an image of the received and focused light and two displaced and parallel roof mirrors, each of which displaces and retro-directs the focusing light onto the display plane. Each reflecting element is stabilized and pivots on gimbals about an arm extending parallel to the optic axis with a distance between apex lines (measured along the optic axis) substantially equal to half the focal length of the objective.

---

The present invention relates in general to the stabilization of optical systems against small-angle deviations thereof from a desired line-of-sight, and is more particularly directed to accidental-motion compensation for any and all types of optical systems. The present invention employs a pair of double-reflecting elements hereinafter generically termed "roof mirrors" and utilizes inertial stabilization of such elements to accomplish stabilization of an image, regardless of slight angular deviations of the optical instrument containing this invention from an original line-of-sight.

There has been developed a variety of optical compensation methods and apparatus primarily directed to levelling instruments. Although certain of these prior art devices have proven highly advantageous, it is noted that they are generally limited in application to operation in a single vertical plane. In addition to the foregoing, there have been developed certain stabilization systems for accidental-motion compensation, in order to substantially stabilize optically-viewed images against vibrations, or the like. In this connection there have been developed refractive systems and electronic systems, as well as inertially-stabilized mirror systems, such as disclosed in my copending patent applications, Ser. No. 575,624, filed Aug. 29, 1966 for Optical Stabilization by Reflecting Means and Ser. No. 579,370, filed Sept. 14, 1966 for Double-Mirror System for Optical Stabilization for Optical Stabilization by Reflecting Means. The present invention is an improvement and simplification over the invention set forth in my above-noted copending patent application. There is provided herein accidental-motion compensation for "angular deviations" of an optic instrument from an original line-of-sight, or "angular orientation," so that "pitch" and "yaw" are eliminated. No "roll" stabilization about an optic axis is incorporated herein inasmuch as such stabilization is not required in many applications, such as stabilized-viewing devices.

The present invention, in general, employs a pair of spaced, double-reflecting elements wherein the reflecting surfaces of each element are disposed in substantially perpendicular relationship to each other. In the following description of the present invention, the term "roof mirror" is employed to define a pair of reflecting surfaces that are mutually perpendicular, and the planes of which intersect at a line or apex. This definition is intended to include not only single-unit roof mirrors, but also spaced mirrors disposed in perpendicular relationship to each other and 90° prisms, such as a porro prism. Actual physical contact of the two edges in the reflecting surfaces is not required, particularly under those circumstances wherein only a limited reflecting surface is to be employed. The invention is herein described with reference to camera applications except as otherwise noted.

In accordance with the present invention, two roof mirrors are pivotally mounted upon substantially frictionless bearings, and are inertially stabilized for fixed orientation along an original line-of-sight by their natural inertial, with possible assistance of a gyroscope or torqueing means. An objective lens directs light onto a first reflecting surface of a first roof mirror, and the light is reflected to the other surface thereof and back to a second roof mirror. The second roof mirror redirects light by reflection back parallel to the original direction of light from the objective. The stabilizer hereof thus provides for translation of the image from the objective, in common with the cube mirror stabilizer of my above-noted copending patent application. The present invention does provide certain advantages in reflective stabilization in that only four reflecting surfaces are required, so as to minimize alignment difficulties and light loss of reflecting surfaces. The invention hereof does direct the outgoing light in the same direction as the incoming light, which is highly advantageous for many applications; and, in common with certain embodiments of the cube mirror stabilizer, allows a division of the full compensation between the two reflective elements hereof.

The present invention is illustrated as to general consideration and a single preferred embodiment thereof in the accompanying drawing wherein:

FIGURE 1A is a schematic diagram of an embodiment of the present invention;

FIGURE 1B is a schematic illustration of the embodiment of FIGURE 1A tilted in the plane of the drawing;

FIGURE 2 is a diagrammatic illustration of the system of FIGURE 1A in plan view;

Figure 3:
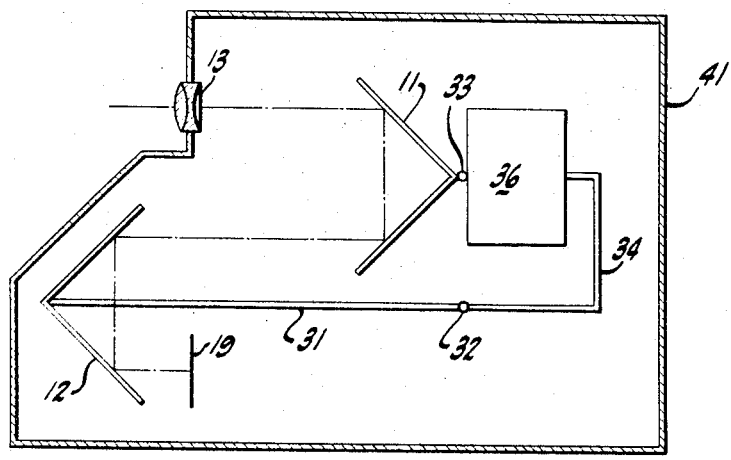
FIGURE 3 is a partial representation of one preferred embodiment of the invention; and, FIGURE 4 is a partial view of a gimbal system useful in mounting elements of the present invention.

Considering now the present invention in some detail and referring first to FIGURE 1A, there will be seen to be shown two roof mirrors 11 and 12 in end or edge view, spaced apart with the apexes thereof parallel to each other. These roof mirrors are disposed in position so that light reflected from the first will enter the second, so as to be reflected therefrom back into the original direction. An objective 13 is provided to focus light onto one of the reflecting surfaces of the first roof mirror 11 along an optic axis 14, and this objective is fixed to a light-tight housing about the present invention and such other optics as may be incorporated in any particular optical device, such as a camera or the like. In the interests of simplicity and clarity, elements such as a housing and the like necessary for any type of optic instrument is not described herein; but, it will, of course, be appreciated that same is provided in suitable form for the particular optic device with which the present invention is employed. Further with regard to the objective lens, or lens system, 13, it is noted that although a single objective lens may be employed, it is preferable to utilize a multiple objective such as three lens elements to improve the quality thereof.

The first roof mirror 11 is mounted to substantially frictionlessly pivot about a two degree of freedom pivot point 16, and the second roof mirror 12 is likewise pivoted about a two degree of freedom pivot point 18. In general, the two pivot points 16 and 18 lie in a single plane that is perpendicular to the optic axis 14 although this may be modified as noted below. The two roof mirrors are balanced about the pivots thereof, and this is schematically illustrated in FIGURE 1A by the heavy dashed lines representing some type of linkage, which in a very simple case may even be direct connections. In addition to the static balance of the mirror systems, each of the roof mirrors with linkages, etc., are constructed so that all moments of inertia are substantially equal, so that unbalanced centrifugal forces will not cause system deflections.

In FIGURE 1A there is illustrated an optical axis 14 of incoming light directed by the objective 13 upon the first surface of the roof mirror 11; and it will be seen that this light path 14 is reflected from the first roof mirror onto the second roof mirror and thence back to a stabilized image plane 19. In order to attain optical stabilization, or accidental-motion compensation, with the apparatus as generally described above, it is necessary to provide particular relationships for the displacement of the roof mirrors and preferably the location of the pivot points therefor. More specifically, the apexes of the two roof mirrors 11 and 12 are separated by a distance equal to one-half the focal length of the objective along a line parallel to the optical axis 14 for 100% compensation, as required for camera applications. In the embodiment of FIGURE 1A, the pivot axes 16 and 18 are each spaced from the respective roof mirror apexes by a distance equal to one-quarter the focal length of the objective; and, furthermore, are located between the roof mirrors. With this particular relationship each of the mirrors provides one-half of the total compensation; and, it is to be noted that the stabilized image plane 19 lies in substantially the same plane as the objective 13.

Stabilization of an image at the plane 19 is accomplished by virtue of image translation through reflection by an amount equal to and opposite from accidental image motion brought about by small angular motions of the objective and connected image plane. The roof mirrors 11 and 12 are maintained in fixed angular orientation by inertial stabilization, so that small degrees of angular motion of a case containing the present invention and mounting the objective and image plane produces a shift in the image position which is exactly counteracted by the compensating mirrors hereof. This point may be further considered with respect to a single roof mirror wherein it can be determined that a motion of the apex of the mirror transverse to the optic axis results in translation of the reflected image by an amount equal to twice the displacement of the apex. This, then, establishes the ability of a roof mirror to move an image across the film plane, for example, so that appropriate motion of the roof mirror apexes may be employed to cancel out motion resulting from accidental rotation of a camera case, or the like, so as to maintain the resultant image stationary at a stabilized image plane 19. The required motion of the roof mirror apexes relative to the objective and film plane is achieved when the sum of the distance between the pivots and apexes is one-half the objective focal length ($f$). With regard to motions in the plane of FIGURE 1A, it will be seen that image motion across a film plane, or stabilized image plane 19, resulting from a tilt of the optical device is equal to the focal length of the objective multiplied by the change in angle or tilting angle of the device. On the other hand, the displacements produced by the relative motions of the roof mirrors in equal to minus the focal length of the objective multiplied by this same change in angle. The combined effect of image motion resulting from tilt of the housing or the like and the compensation provided by the roof mirrors is thus zero, so that the image remains undisplaced even though the camera or optical instrument is tilted.

The above described compensation, or stabilization, may be further understood by reference to FIGURE 1B showing the invention tilted through a small angle $\theta$ in the plane of the drawing. This tilting is herein shown to occur about a central point between the pivots 16 and 18. Both the objective 13 and image plane 19 are fixed relative to a housing about the device and thus move therewith as shown. Some translation of the roof mirrors occurs, as shown, however the image is still focused at the plane 19 so that stabilization is shown to be achieved.

With regard to possible angular deviations or rotations of an optical instrument case about an axis lying in the plane of FIGURE 1A, it is possible to consider each of the roof mirrors as acting like a plane mirror located at the apex of the roof and, thus, the two mirrors will focus an incoming ray that passes through the center of the objective onto a plane directly below the center of the objective. FIGURE 2 generally depicts the roof mirrors as plane mirror surfaces 11 and 12 in the plane of the drawing. Tilting, or rotation of the device in this plane translates the objective to the position 13, as shown, however, the image plane remains beneath the objective so that the image is still focused at the image plane, as indicated by the optic axis $14^1$.

It will thus be seen that tilting or rotation of the invention in the planes of either figure described does produce a translation of elements and light paths, but yet causes the image to be focused at the same location in the plane normal to the optic axis which contains the back nodal point of the objective. Consequently there is no relative motion of the image across the plane 19 when the housing or case is tilted; and, thus, the image is maintained in the same position at plane 19 for rotations or tilting of a case or housing mounting the objective and plane 19 about axes perpendicular to the plane of FIGURE 1A or parallel thereto. It will be appreciated that any intermediate direction of rotation or tilting may be resolved into components in the two orthogonal directions considered above; and, thus, that the present invention does provide for stabilizing an image at the plane 19. A detailed analysis of the operation of the optics generally illustrated in the above described figures establishes that the stabilized image plane always remains parallel to the film plane originally located thereon, but that during compensation there is a slight shift of the image plane along the optic aixs. Calculation establishes that this shift is quite small and is proportional to the square of the angle of motion ($\theta$). More particularly, the image plane moves an amount equal to $\frac{1}{2} f(\theta)^2$ which is so minute as to pose no particular problem.

In common with other stabilization systems, it is necessary herein to incorporate a correction factor for viewing instruments, as compared to cameras. Thus for telescopes or binoculars, the total pivot arm distance for the two mirrors is reduced from $f/2$ and is made $$f/2 \left( 1 \pm \frac{1}{M} \right)$$

where M is the magnification of the system, and the minus sign thereof is employed for viewing devices giving an erect image. Reference is made to my above-noted copending patent application for further description establishing this particular relationship.

There has been set forth above certain definitions and limitations relative to the present invention, particularly in connection with regard to spacing and location of vital elements. It is, however, possible in accordance with this invention to incorporate certain variations therein, as for example by inserting a relatively weak negative lens between the roof mirrors so as to modify the total focal length from objective to focal plane. This then slightly changes the required separation of mirror apexes and also changes the required pivot point locations so that they no longer lie exactly in a plane normal to the optic axis. The degree of modification of these requirements depends upon the particular characteristics of such an inserted lens or lens system and may be readily determined from known optical principles.

It is to be appreciated that the present invention may take a variety of different physical forms in actual practice It is not intended herein to describe or illustrate all of these possible variations; however, there is shown in FIGURE 3 one physical embodiment of the invention wherein dead space behind one of the compensating mirrors is employed for mounting of a gyroscope, or the like. Referring to this figure wherein the same numerals are employed as in FIGURE 1A, it will be seen that the objective 13 directs light onto the first compensating mirror system 11, which in turn, reflects light back onto the second compensating mirror system 12. Considering this particular apparatus as being employed in a camera, then the second compensating mirror system 12 redirects the light onto a film plane 19 which, as noted above, is disposed in substantially the same plane as the objective 13. In this particular embodiment of the invention the second compensating mirror 12 is mounted by means of a bar, or yoke, 31 extending from the apex of the mirror system and mounted upon substantially frictionless bearings to pivot about a pivot point 32. The other compensating mirror system 11 is mounted upon substantially frictionless bearings to pivot about a pivot point 33, shown to be disposed adjacent the apex of this first mirror system, and disposed in the same plane as pivot point 32, with such plane being normal to the axis of the objective. In this illustrated embodiment of FIGURE 3, the yoke 31 extends beyond the pivot point 32, and carries linkage 34 connected to a gyroscope assembly 36 that is, in turn, also mounted at the pivot point 33. Balancing of the entire compensating system about the pivot points 32 and 33 is accomplished by appropriate distribution of weights on opposite sides of the pivot points, and inertial stabilization is enhanced by the rotating mass of the gyroscope rotor, so that the roof mirrors are maintained in original angular orientation despite accidental tilting or jarring of the housing 41 about the optical system. It is to be appreciated that the objective 13 and stabilized image plane are fixed with respect to housing, so as to move therewith; and, thus, an image focused at the plane 19 from the objective is, in fact, stabilized. It is noted that various additional elements are normally employed in optical devices such as that shown in FIGURE 3; however, no attempt is made herein to disclose details of film plane construction, or film loading for example. Also, there may, of course, be incorporated a variety of additional optical elements behind the stabilized image plane, as required or desirable for particular applications.

It has been noted above that the pivot points for the two roof mirrors are to generally lie in the same plane which is perpendicular to the optical axis, or axis of the objective. Each of the pivot points provides two degrees of freedom of motion; and, thus, each actually comprises a pair of perpendicular axes. In practice it is conventional to utilize some type of gimbal system for mounting of the roof mirrors of this invention. It is particularly noted, however, that the general requirement above is susceptible to substantial modification. Thus the two axes of each pivot need not intercept, the axes perpendicular to the mirror apexes need not be in the same plane, and under some circumstances it is possible for the pivot axes parallel to the mirror apexes not to lie in a plane normal to the optic axis. For simplicity of description, let it be assumed that each pivot point comprises a vertical and horizontal axis about which the support yoke, or the like, may rotate. With this convention, then, the two horizontal axes of the separate pivot points normally lie in the same plane normal to the optical axis, and the two vertical axes of the separate points may, but need not, lie in the same plane normal to the optic axis, and these two planes need not coincide. For certain applications it is advantageous to separate the pivot axes; and one possible gimbal arrangement for this purpose is schematically illustrated in FIGURE 4.

Figure 4:
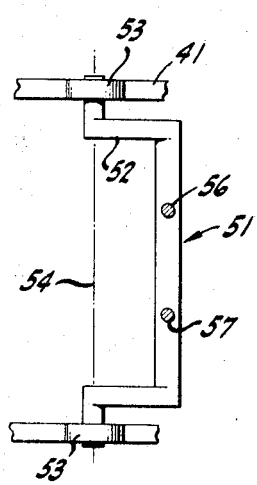

Referring to FIGURE 4, it will be seen that there is provided a frame 51 having offset top and bottom projections 52 that are, in turn, pivotally mounted, as by substantially frictionless bearings 53, on the same vertical axis in the housing 41. This frame 51 also carries horizontal frictionless bearings 56 and 57 which are vertically aligned, as illustrated. Assuming that the particular gimbal mounting of FIGURE 4 is employed in the apparatus of FIGURE 3, it will be seen that the vertical axes of the two pivot points 32 and 33 are comprised by the single vertical axis 54; and, furthermore, that the horizontal axes of these two pivot points are vertically aligned, so as to lie in the same plane normal to the optic axis. This particular variation in structure, briefly described in connection with FIGURE 4, is advantageous in certain circumstances wherein space problems or mechanical requirements may be best satisfied by displaced axes. Actually, the pivot axes do not have to lie in planes normal to the optic axis, but the apex-to-apex distance must remain $f/2$. Inasmuch as the roof mirrors 11 and 12 may actually be considered as plane mirrors in one dimension, the "vertical axes" may thus be positioned as desired, as long as the apex separation is maintained. With displaced "vertical axes," the image plane is shifted normal to itself. Some applications of the invention may tolerate such a shift, and thus the invention is not limited to exclude such applications.

The present invention will be noted to provide a stabilized image plane relatively close to the roof mirrors utilized for compensation; and, under certain circumstances, it may be advantageous to displace the stabilized image plane further away from the mirrors in order to provide adequate space for physical elements incorporated in a complete camera design, for example. This may be accomplished by utilizing an alternative objective lens system, such as, for example, an inverse telephoto lens which displaces the effective position of the objective towards the first compensating mirror, and, in fact, may locate same behind such mirror. This does not disturb the stabilization properties of the present invention, but, instead, serves only to move the stabilized image plane to the right in FIGURE 3, for example, so as to place it in a possibly more convenient location. Also, the roof mirror assemblies may be rotated about their intersection lines to provide greater clearances without affecting the performance of the stabilizer in the least.

With regard to the gyroscope assembly 36, it is noted that same may be relatively conventional, particularly insofar as general principles are concerned. There have been developed numerous minute gyroscope assemblies which are admirably suited for application in connection with the present invention. Insofar as providing power for gyroscope operation, it is noted that a plurality of alternatives are possible, such as, for example, a battery-operated electric motor carried in the gyroscope gimbals; and, it is even possible to rotate the gyro rotor manually for certain applications. This particular gyroscope assembly is considered to be a free gyro; and, in the instance wherein the camera, or the like, incorporating the present invention is intended to be traversed or panned during the taking of pictures, conventional means may be employed to precess the gyro, so as to cause the compensator hereof to follow intentional panning motions of the housing. Details of precession and control thereof is beyond the scope of the present description, but it is generally noted that gyroscope characteristics may be tailored to any particular application, so that the gyroscope serves to inertially stabilize the mirrors over some predetermined small angular deviation of the housing from an original line-of-sight and, yet, to precess the compensating mirrors with the housing for a larger angular motion thereof. Rather simple mechanical means for accomplishing this type of gyroscope action are available.

Although the present invention has been described with respect to particular preferred embodiments wherein the separate roof mirrors are independently mounted, it is also possible, in accordance herewith, to provide a single pivot point about which each of the roof mirrors pivots. In this instance it is desirable for the single pivot point to be located approximately mid-way between the roof mirrors; and, in practice, a single yoke is then generally employed between the two roof mirrors in line with the apexes thereof and extending through this single pivot point. While this coupled arrangement has certain advantages, it does have the disadvantage of introducing an additional image degradation in the stabilization, so that the slight shift in image plane, noted above to be herein proportional to the square of the angle, is modified in this alternative embodiment to incorporate an additional term comprising the deviation angle itself.

Although the present invention has been illustrated in connection with a single preferred embodiment thereof, it is to be appreciated that numerous variations in the showing are possible; and, consequently, it is not intended to limit the invention to the exact terms of the description or details of illustration. Reference is made to the appended claims for a precise delineation of the true scope of the present invention.

It is claimed that:

1. An apparatus for optically stabilizing an image by reflection comprising: a first member having a pair of mutually perpendicular interconnected reflection surfaces forming an optical apex line therebetween, an objective lens system having a predetermined focal length directing light rays on said first member along an optical axis, a second member having a pair of mutually perpendicular interconnected reflection surfaces forming an optical apex line therebetween disposed in an optically aligned position with said first member to intercept light therefrom and reflect same to an image plane, said first and second members being disposed with the optical apex lines being parallel to each other and separated a distance along the optical axis of the objective lens system a distance substantially equal to one-half the focal length of the objective lens system, gimbal mounting means mounting said first and second members for gimbal movement relative to said objective lens system, inertial means connected to said first and second members to maintain said first and second members at a substantially fixed angular position in space while the objective lens system and the image plane are angularly moved in space, whereby light rays from said objective lens system are focused at a stabilized position on the image plane despite angular deviation of the objective lens system and the image plane from an original line of sight.

2. Apparatus as set forth in claim 7 further defined by each of said first and second members being pivotally mounted by said gimbal mounting means for about at least one two-degree of freedom pivot point and said inertial means includes each member being balanced about said pivot point by counterweights for inertial stabilization.

3. Apparatus as set forth in claim 7 further defined by said gimbal mounted means including said members each being mounted upon two degree of freedom mounts at separate pivot points at the optical apex line with each optical apex line lying in the same plane perpendicular to the optic axis of the objective.

4. Apparatus as set forth in claim 7 further defined by the separation of the optical apex lines of both said first and second members along the optic axis being one-half the focal length of the objective times a factor $$\left(1 \pm \frac{1}{M}\right)$$

wherein M is the optical magnification of the apparatus, and the minus sign is employed for viewing devices having an erect image.

5. Apparatus as set forth in claim 7 further defined by said inertial means including at least one gyroscope assembly coupled to both members.

6. Apparatus as set forth in claim 7 further defined by said gimbal mounting means including means to mount each of said members in substantially frictionless manner about mutually perpendicular axes lying in a plane normal to the optical axis of said objective lens system.

7. An optical stabilizer comprising: a housing, an objective lens having a predetermined focal length mounted on said housing for movement therewith, a plane for displaying an image mounted on said housing for movement therewith, a first and a second element mounted on said housing, each of said first and second elements formed with two mutually perpendicular interconnected reflective surfaces having an optical apex line between the two surfaces, a first reflective surface of the first element being positioned to receive light from said objective lens and reflect said light to the second reflective surface of said first element, said second element being positioned to receive light derived from the objective lens reflected from the second reflective surface of said first element on the first reflective surface of said second element and reflect said light to the second reflective surface of said second element and thence to said plane, each of said reflecting elements being mounted for gimbal movement within said housing, inertial means mounted to each of said gimbal mountings to maintain each of said elements in a substantially fixed angular position in space when said housing is angularly moved and said reflecting elements being mounted with the optical apex line of said first reflecting element being parallel to and spaced a distance of approximately one-half focal length of said objective lens from the optical apex line of said second reflective element.

References Cited

UNITED STATES PATENTS

| | | |
|---|---|---|
| 1,628,777 | 5/1927 | Henderson. |
| 2,089,745 | 8/1937 | Graf. |
| 2,779,231 | 1/1957 | Drodofsky. |
| 2,944,783 | 7/1960 | MacLeish et al. _____ 350—16 |
| 2,939,363 | 6/1960 | Kaestner _____ 350—16 |
| 2,959,088 | 11/1960 | Rantsch _____ 350—16 X |
| 2,981,141 | 4/1961 | Armstrong et al. |

FOREIGN PATENTS 1,015,916  1/1966  Great Britain.

DAVID SCHONBERG, *Primary Examiner.*

P. R. GILLIAM, *Assistant Examiner.*

U.S. Cl. X.R.

88—1